No. 806,351. PATENTED DEC. 5, 1905.
A. DE LASKI.
VEHICLE TIRE.
APPLICATION FILED AUG. 11, 1904.

2 SHEETS—SHEET 1.

Witnesses:
F. G. Hachenberg.
Henry Thieme.

Inventor:
Albert de Laski
By Brown & Seward
Attorneys

No. 806,351. PATENTED DEC. 5, 1905.
A. DE LASKI.
VEHICLE TIRE.
APPLICATION FILED AUG. 11, 1904.

2 SHEETS—SHEET 2.

Witnesses:
J. G. Hachenberg.
Henry Thieme.

Inventor:
Albert de Laski
By Brown & Seward
Attorneys

UNITED STATES PATENT OFFICE.

ALBERT DE LASKI, OF TRENTON, NEW JERSEY, ASSIGNOR TO THE DE LASKI AND THROPP CIRCULAR WOVEN TIRE COMPANY, OF TRENTON, NEW JERSEY, A CORPORATION OF NEW JERSEY.

VEHICLE-TIRE.

No. 806,351.     Specification of Letters Patent.     Patented Dec. 5, 1905.

Application filed August 11, 1904. Serial No. 220,326.

*To all whom it may concern:*

Be it known that I, ALBERT DE LASKI, a citizen of the United States, and a resident of Trenton, in the county of Mercer and State of New Jersey, have invented a new and useful Improvement in Vehicle-Tires, of which the following is a specification.

My invention relates to vehicle-tires with the object in view of preventing the rolling of the tire longitudinally when under heavy strain—as, for instance, on the driving-wheels of vehicles.

A practical embodiment of my invention is represented in the accompanying drawings, in which—

Figure 1:
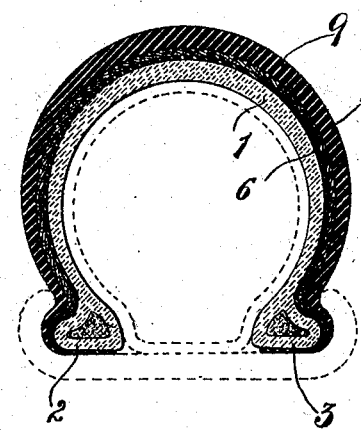
Figure 2:
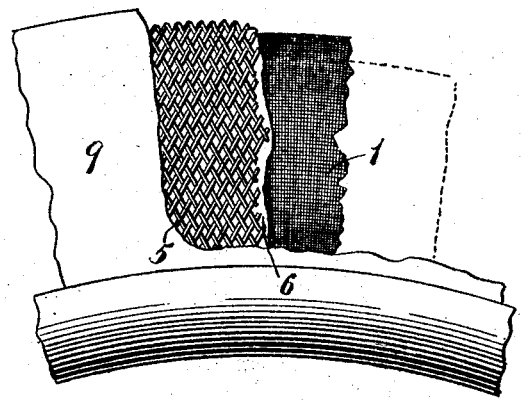
Figure 3:
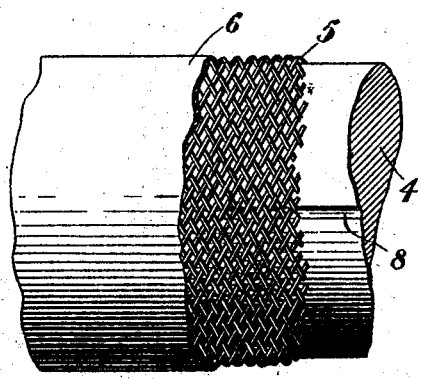
Figure 4:
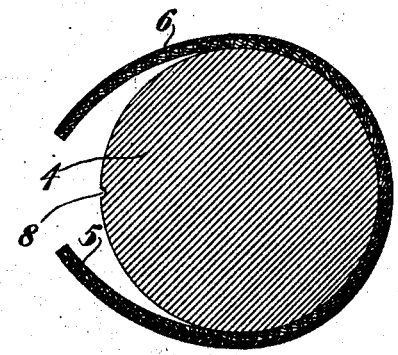
Figure 5:
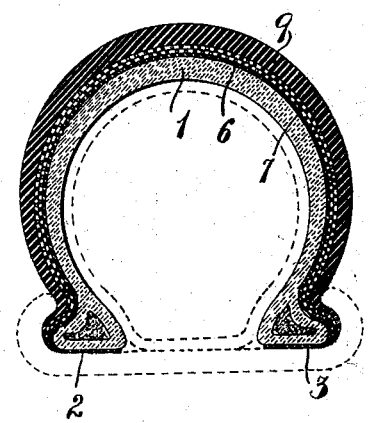
Figure 6:
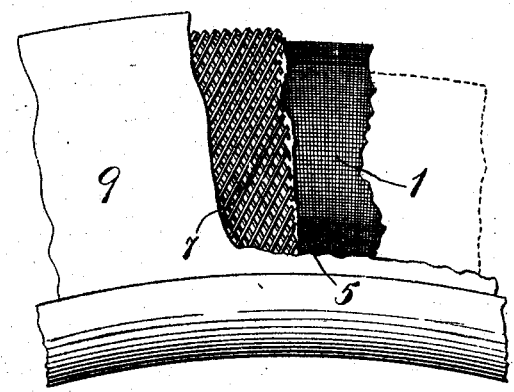
Figure 7:
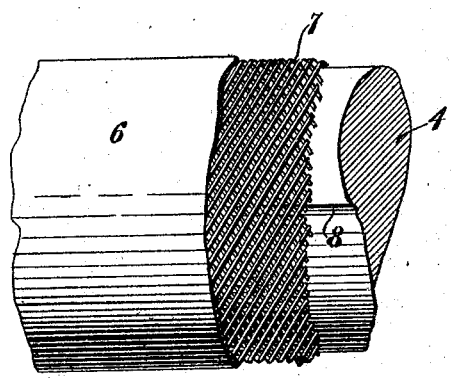
Figure 8:
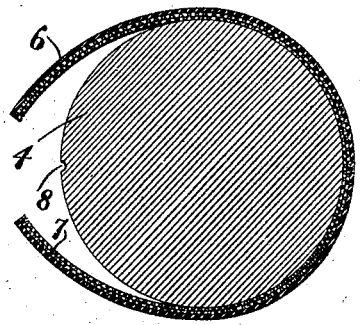

Figure 1 is a view of the completed tire in cross-section, representing the inner tube and the clencher-ring in dotted lines. Fig. 2 is a view of a portion of the tire in side elevation broken away to show the different layers comprising it. Fig. 3 is a view in side elevation of part of the mandrel on which the restraining-jacket is formed, showing the restraining-jacket partially broken away. Fig. 4 is a transverse section through the same, showing the restraining-jacket severed and partially removed from the mandrel; and Figs. 5, 6, 7, and 8 represent views corresponding with Figs. 1, 2, 3, and 4 of a modified construction of the restraining-jacket.

Referring to the form of restraining-jacket shown in Figs. 1 to 4, inclusive, the tire is composed of a circular-woven fabric 1, having its opposite edges developed into shape, as shown at 2 and 3, for being held by the clencher-ring.

While the circular-woven fabric forms an exceedingly strong and durable body under all radial strains, it has been found important where a tire is subjected to great frictional strain in longitudinal direction to reinforce this heavy circular-woven body by the application thereto of a jacket composed of threads disposed obliquely with respect to the longitudinal axis of the tire in order to exert a restraining pull more or less in a direction opposite that in which the tire is acted upon by the frictional strain exerted upon it by the surface with which it is in contact. To this end I form upon a mandrel 4, preferably circular in cross-section, a jacket composed of a layer of threads 5 and a layer of soft rubber 6. The threads 5 may be braided directly onto the mandrel, as shown in Figs. 1 to 4, or they may be wound on the mandrel, one course obliquely in one direction and the other course obliquely in the opposite direction, as shown in Figs. 5 to 8, inclusive, where the wound threads are indicated by 7. In both instances, however, there is one course of threads extending obliquely in one direction and another course of threads extending obliquely in the opposite direction, so as to produce a restraining pull whether the wheel on which the tire is placed be driven forwardly or backwardly. On the layer of threads 5 or 7 I apply a thin layer of soft rubber 6, pressing it closely into engagement with the layer of threads 5, and this having been done I cut the jacket longitudinally along a shallow groove 8, formed in the mandrel, and then apply it to the circular-woven fabric 1 with the layer 6 adjacent to the circular-woven fabric 1 and the layer of woven threads 5 exterior. It is intended to make the restraining-jacket composed of the layers 5 and 6 of such extent transversely that it will extend down more or less around the clencher ends 2 and 3 of the circular-woven fabric, so that the clencher-hooks on the rim will overlap it in order to hold the edges of the restraining-jacket firmly clamped between the hooks on the clencher-ring and the clencher ends 2 and 3 of the circular-woven fabric. Exterior to the restraining-jacket thus formed I mold the tread 9 of the tire in any well-known or approved manner and vulcanize the whole together. When this vulcanizing process is completed, it will be found that the soft-rubber layer 6 has become intimately interlocked with the exterior of the circular-woven fabric 1 and the exterior of the thread layer of the restraining-jacket, so that the threads of the jacket 5 will be held securely in position, and the jacket so formed, while increasing the thickness of the tire but very little, will exert a very powerful restraining influence against the rolling of the body of the tire and will cause it to withstand without injury the great strains which are commonly imposed upon it in use.

While I prefer to braid the threads as shown in Figs. 1 to 4, I have found that when wound as shown in Figs. 5 to 8, inclusive, and held in position by the soft layer of rubber they will still exert a fairly satisfactory restraining influence.

What I claim is—

1. A clencher-tire comprising a body composed of a heavy circular-woven fabric, a restraining-jacket applied thereon consisting of courses of threads extending obliquely to the longitudinal axis of the tire and a tread applied on the restraining-jacket, the whole being bound together in a coherent mass.

2. A clencher-tire comprising a body composed of a heavy circular-woven fabric, a restraining-jacket applied thereon consisting of braided threads, a layer of soft rubber interposed between the said braided threads and circular-woven fabric and a rubber tread applied on the braided threads, the whole being vulcanized into a coherent mass.

In testimony that I claim the foregoing as my invention I have signed my name, in presence of two witnesses, this 5th day of August, 1904.

ALBERT DE LASKI.

Witnesses:
   J. H. FETTER,
   JOHN MATHESON.